Jan. 14, 1958   E. A. FRARY ET AL   2,819,751
TIRE TREAD

Filed March 19, 1953   3 Sheets-Sheet 1

INVENTORS
Evan G. Frary
David E. Crooker
BY
ATTORNEYS

Jan. 14, 1958  E. A. FRARY ET AL  2,819,751
TIRE TREAD

Filed March 19, 1953  3 Sheets-Sheet 2

INVENTORS
Evan A. Frary
David E. Crocker
BY
ATTORNEYS

Jan. 14, 1958 E. A. FRARY ET AL 2,819,751
TIRE TREAD
Filed March 19, 1953 3 Sheets-Sheet 3

INVENTORS
Evan A. Frary
David E. Crocker
BY
Morrell & Morrell
ATTORNEYS

United States Patent Office 2,819,751
Patented Jan. 14, 1958

2,819,751

TIRE TREAD

Evan A. Frary, Marshfield, Wis., and David E. Crooker, Ontonagon, Mich.; said Frary assignor to Lloyd L. Felker, Marshfield, Wis.

Application March 19, 1953, Serial No. 343,404

2 Claims. (Cl. 152—209)

This invention relates to improvements in tire treads.

The conventional tire tread comprises a plurality of straight parallel ribs or rider strips which are separated by straight grooves. These straight rider strips have been useful in preventing sidewise skidding tendencies. Straight rider strips, however, have not been too effective in providing traction on snow or ice as straight rider strips are inclined to slip and spin in the same place without gripping the road when a surface which provides poor traction is encountered. When traction augmenting coils are used in straight rider strips, greatly increased traction is provided as the coils tend to bite into a slippery surface. However, even when metal traction coils are used, if the rider strips and coils are straight as in conventional tires, there is a tendency for the rider strips to dig into the snow and make straight, parallel elongated pockets and to spin in these pockets. In addition, with the present day trend toward oversized tires which carry a low air pressure there is a tendency for the grooves between rider strips to close up under the weight of the car so that they are rendered relatively ineffective for traction purposes.

It is a general object of the present invention to provide an improved tread construction of the type which includes spaced circumferential rider strips with intervening grooves, wherein the rider strips are transversely waved in a predetermined manner to provide increased traction, and wherein means may also be provided for preventing the grooves between the rider strips from closing under the weight of the vehicle.

A further object of the invention is to provide an improved tread construction wherein the grooves between rider strips are relatively wide so as to freely receive snow, mud or the like, so that portions of the tire between the rider strips share in the support of the vehicle, said relatively wide grooves being maintained in open condition by novel features of the present invention even during braking and acceleration and there being means for closing off the ends of sections of the grooves at intervals so that traction is increased and so that when braking action takes place material is dammed up to augment said action.

A further object of the invention is to provide a tread construction as above described which is so formed that when metal traction augmenting coils are used in the rider strips said coils are rendered more effective, the coils waving in conformity with the rider strips, and tending to sweep transversely back and forth on the road so that the strip of road which is covered by the tread portion of the tire is contacted substantially throughout its width by coils.

A further object of the invention is to provide a tread construction wherein the rider strips are so waved in a transverse direction that stock from the surface of the rider strips which may resiliently "pile up" under pressure in front of the places of contact of the rider strips with the road is "discharged" at intervals into the grooves between rider strips because of the transversely waved pattern of said rider strips. Thus, excessive wear is avoided.

A more specific object of one phase of the invention is to provide a tread construction wherein there are novel protuberances or lugs projecting at intervals into the grooves between rider strips, said protuberances being designed to prevent the grooves from closing under the weight of the car, and also being preferably constructed to provide a complete circumferential air space in each groove so that "cupping" of air between protuberances with a resulting singing noise is prevented.

A more specific object of another phase of the invention is to provide in a tread construction where the rider strips are transversely waved, an arrangement wherein said rider strips are transversely tilted, first in one direction and then in another depending upon the direction of curve of the rider strip to prevent excessive wear which might occur on leading edge portions of the transversely waved rider strips during use. The arrangement also provides for more even wear on traction augmenting coils when such coils are used in the waved rider strips.

With the above and other objects in view, the invention consists of the improved tire tread construction, and all of its parts and combinations, as set forth in the claims, and all equivalents thereof.

In the accompanying drawings, illustrating several embodiments of the invention, Fig. 1 is a fragmentary perspective view of the upper portion of a tire;

Figure 1:
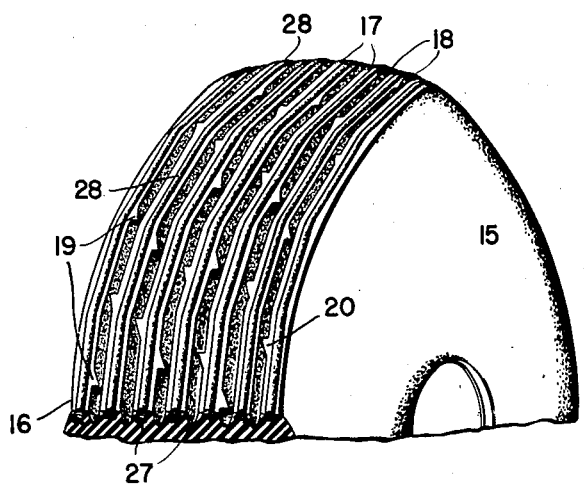

Referring more particularly to the drawings, the numeral 15 designates a tire having a tread portion 16 formed with a plurality of spaced circumferentially extending rider strips 17 separated by intervening circumferentially extending grooves 18.

Projecting from one side of each rider strip is a plurality of circumferentially spaced protuberances or lugs 19, and projecting from the opposite side of each rider strip, in between pairs of the lugs 19, are similar lugs 20 which face in a reverse direction from that of the lugs 19.

Figure 4:
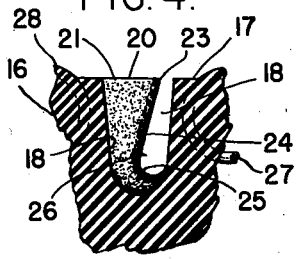
Fig. 4 is a sectional view taken on the line 4—4 of Fig. 3.
Figure 3:
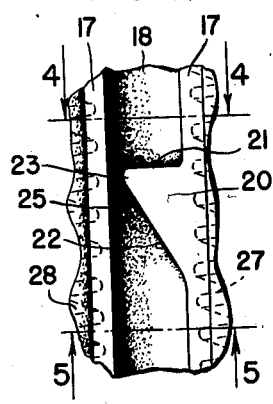
Fig. 3 is a plan view of a fragment of the tread surface showing one of the protuberances in a groove.
Figure 5:
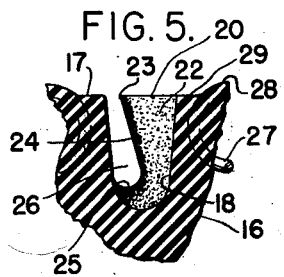
Fig. 5 is a sectional view taken on the line 5—5 of Fig. 3.

Referring to Fig. 3, which shows one of the lugs 20, it is apparent that in plan view it includes a straight end 21 and a side 22 which angles obliquely outwardly from the rider strip to join the end 21 in a point 23. When there is no pressure on the tire, the point 23 is spaced somewhat from the side wall of the opposite rider strip, as is shown in Figs. 4 and 5. These latter figures also show that the protuberances are undercut as at 24 to produce an inward taper in vertical cross section. Near the bottom of the groove the bottom of each protuberance has a web portion 25 which projects somewhat above the bottom of the groove and connects with the side wall of the opposite rib. This prevents cracking of the rubber near the bottoms of the grooves when the tire is under stress. The undercutting provides an enlarged air space 26. When a portion of the tread is in contact with the road under the weight of a vehicle there is a tendency for the grooves 18 between rider strips to close. However, with the present construction, the points 23 of the protuberances will contact the opposite side wall to prevent closing. Due to the undercutting at 24, even when the tread is thus under pressure, there is always a communicating air space at 26 so that air is not "cupped" in groove portions between lugs to produce a singing noise during use. The lugs or protuberances 19 are constructed in the same manner as the lugs 20, but are reversed in position in the tire, as shown in Fig. 2.

Figure 2:
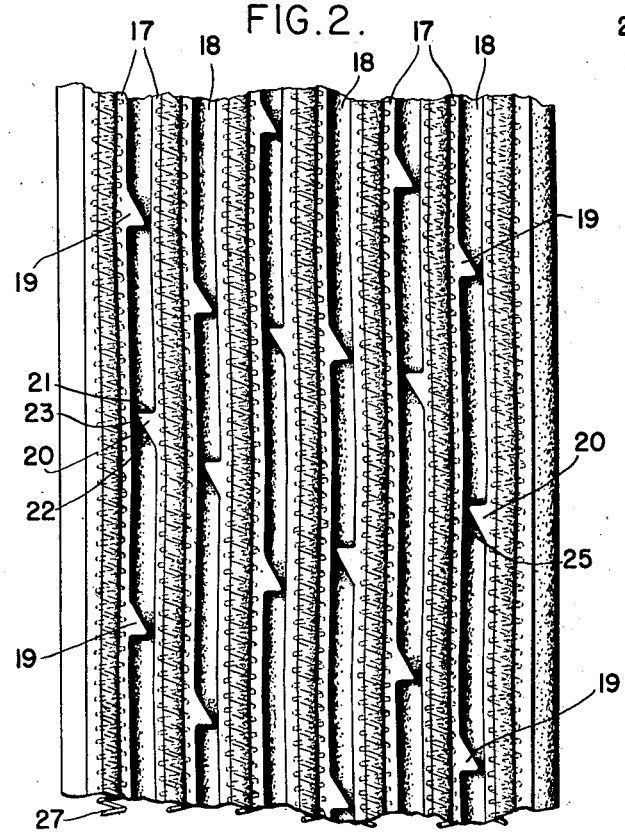
Fig. 2 is a fragmentary plan view of the tread surface.

The transversely waved rider strip arrangement is particularly advantageous when traction augmenting coils 27 are used in the rider strips as shown in Fig. 2. It will be noted that in the tread arrangement shown each rider strip has a circumferentially extending road-contacting convexity 28 which permits the upper portions of the convolutions of the coils to project somewhat above the main surface portions 29 of the rider strips, as shown in Fig. 5. This arrangement is fully described in Crooker Patent No. 2,619,678, issued December 4, 1952.

Figure 6:
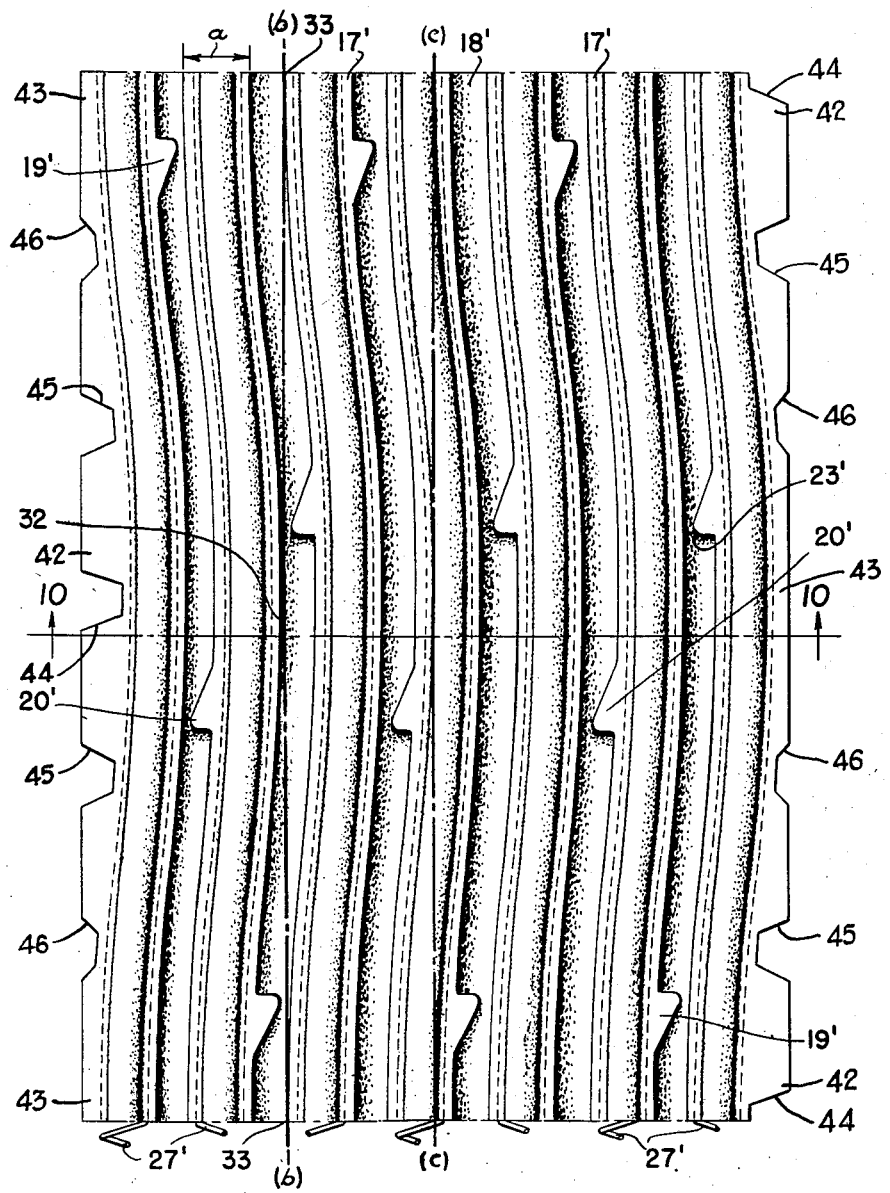
Fig. 6 is a fragmentary plan view of a tread surface showing a design with a more pronounced sweep for the curve of the rider strips than is employed in the form of Fig. 2.
Figure 10:
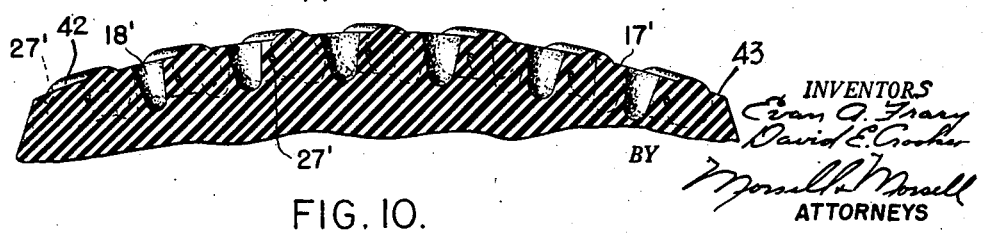
Fig. 10 is a sectional view taken on the line 10—10 of Fig. 6.

In the form of the invention shown in Figs. 6 and 10, like parts are designated by the same numerals as those used in Fig. 2, except that prime marks are applied. In this construction the transverse waving of the rider strips is more pronounced than in Fig. 2. This view illustrates a tire with seven rider strips and it will be seen that the amount of transverse waving is limited so that the center line (c) for the tread surface of the tire is in no place outside of the width of the center rider strip. To bring this about, the amount of transverse waving where this is at its maximum, is less than half of the width of the rider strip. Where the rider strips are one-half inch wide the preferred transverse offset due to waving is slightly more than one-eighth of an inch at its maximum. All of the other rider strips are transversely waved in the same manner as the center rider strip. For a passenger car tire it is preferred to have twelve sections like that shown in Fig. 6 so that there are twelve waves in each direction.

In the arrangement of Fig. 6, referring to the imaginary line (b), it is apparent that the point 32, which is the point of greatest wave toward the right, of the second rider strip from the left, approximately touches the line (b—b) and that the points 33 which are the points of greatest wave toward the left of the third rider strip from the left, also approximately touches the line (b—b). To produce this result it is necessary to have the extent of wave in each direction, that is the amount of deviation from normal, at least equal to one-half the width of a groove, and preferably no greater than one-half the width of a rider strip. Thus, it is apparent that the waved arrangement causes the rider strips to sweep transversely back and forth on the road so that the strip of road which is covered by the tread is subjected to contact, throughout its width, by rider strips. It is also apparent that when traction augmenting coils 27' are used in the rider strips that the coils also tend to sweep transversely back and forth on the road so that the strip of road which is covered by the tread portion of the tire is subjected to contact throughout almost all of its width by the coils 27'. With conventional constructions wherein straight rider strips and grooves are employed, there are portions of the road beneath the grooves which are never wiped by rider strips or coils.

In the tread construction of Fig. 6, and referring more particularly to Fig. 10, it is clear that the outer edges of the tread are so arranged that there is no necessity for any break in the outermost rider strips. The amount of waving has been worked out so that all of the rider strips are continuous and may be uniformly waved throughout their length without having the outermost rider strips broken up by waving completely off of the side edges of the tire at intervals. In addition to the above, a wave which is too pronounced may break up snow or mud so completely that there is nothing to grip.

Referring to Figs. 6 and 10, and more particularly to the rider strip on the extreme left hand side of Fig. 6, it is apparent that said rider strip is of varying width along the outer side of the tire. For example, at location 42 there is a maximum amount of width of stock in the rib, whereas at locations 43 there is a minimum amount of width of stock.

Referring now to the rider strip on the extreme right hand side of Fig. 6 it will be seen that the minimum width of stock 43 is opposite the maximum amount of width of stock 42 on the left hand side of the tire. In order to provide for proper balance in wear and to provide a place for rubber in the wider portions of the outermost rider strips to displace into, a novel arrangement has been worked out whereby recesses 44, 45 and 46 in the side walls of the tire have outer ends which extend through the outermost rider strips to the surface of the tread as shown in Fig. 6.

The depth of the recesses 44, 45 and 46 varies with the width of the rider strip portion through which the ends of said recesses extend. For example, the recesses 44 are the deepest transversely of the tread, the recesses 45 are the next deepest transversely of the tread, and the recesses 46 are the shallowest transversely of the tread. These recesses provide space for the rubber of the outer rider strips to displace into during use, the transverse depth of which space is greater or less depending upon the width of the particular rider strip portion through which the recess extends.

In the arrangement of the present invention, for a passenger car tire, the rider strips are preferably one-half of an inch wide at dimension (a) and are adapted to accommodate wire coils which are three-eighths of an inch in diameter. The grooves between rider strips must have a width equal to at least half of the dimension (a). Where the rider strips are one-half inch in width the grooves are preferably nine-thirty-seconds of an inch wide. In the design of Fig. 2, which shows the minimum amount of waving, this minimum is one-sixteenth of an inch deviation from the normal at the point of greatest transverse wave, whereas in the design of Fig. 6, the corresponding deviation is slightly more than one-eighth of an inch, that is point 32 of Fig. 6 is located slightly more than one-eighth of an inch farther to the right than it would be if the rib were straight. This assumes that the rider strips are one-half inch wide and that the grooves are nine-thirty-seconds of an inch wide, as heretofore specified. This deviation is preferably no greater, at its maximum, than one-half the width of a rider strip.

Where rider strips are curved to the extent shown in Fig. 6, there is a tendency for road contact with a leading edge of a curved portion of the rib to cause excessive wear on said edge. In order to eliminate this tendency the construction of Figs. 7, 8 and 9 has been devised. Here, a rider strip 34 having a coil 35 therein, is illustrated. This rider strip is waved in the same manner as the rider strips of Fig. 6, in the same amount.

Assuming point 36 to be a point of maximum waving toward the left, and proceeding upwardly on the sheet, the rider strip then waves toward the right and then back again. At point 36 the rider strip has no lean, and at points 37 and 38, where there is a maximum wave in the opposite direction, that is, toward the right, there is also no lean.

Figure 8:
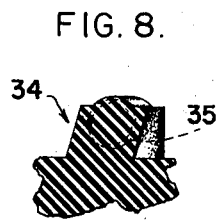
Fig. 8 is a sectional view taken on the line 8—8 of Fig. 7.

Intermediate points 36 and 37, however, as indicated by Fig. 8 which is a section taken along the line 8—8, it will be seen that the rider strip leans toward the right. The amount of lean gradually increases from nothing at the point 36 to a maximum at line 8—8, and then gradually diminishes to zero at point 37.

Referring now to the part of the rider strip which is below the point 36 it will be seen that a gradually increasing lean in the reverse direction takes place, which lean reaches a maximum at line 9—9 where the rider strip leans approximately the same amount to the left as it leans toward the right in Fig. 8. This amount of lean gradually diminishes to zero at the point 38. It is preferred to have the amount of lean of Figs. 8 and 9 equal to approximately one-half of the directional offset of a rib portion due to the waved arrangement, as is clear from Figs. 8 and 9. That is, the lean is such that edge 40 is one-half way between normal and edge 41. It is preferred to have all of the rider strips of a tire constructed in this manner.

Assuming that the tire is rotating in the direction indicated by the arrow (d) there will be an application of force from the road in a reverse direction, as indicated by the arrows (e). This force from the road will act against the edge portions 39 of the rider strips and will tend to straighten up the leaning portions of the rider strips so that they are closer to a ninety degree angle. With this arrangement excessive wear on leading curved edges is prevented, and greater mileage is obtained from the tire.

In use of tires having the transversely waved rider strips of Figs. 2 or 6 the rider strips tend to sweep back and forth on the road so that either the major portion (as in Fig. 2) or the entire strip of road (as in Fig. 6), which is covered by the tread, is swept by rider strip portions to greatly increase traction. Where metal coils are used in transversely waved rider strips, the metal coils act on substantially the entire width of the strip of the road which is covered by the tire. Thus, the efficiency of the metal coils is greatly increased.

With the novel lugs shown in Figs. 2, 3, 4 and 5, the grooves between rider strips are prevented from closing under the weight of the car and are, therefore, kept effective at all times for traction purposes. The points 23 of the lugs contact the side walls of the adjacent rider strips and positively prevent closing of the grooves. At the same time, due to the novel shape of the lugs as shown in Figs. 3, 4 and 5, there is never any cupping of air between pairs of lugs to cause a singing noise during use of the tire. The straight edges 21 of the lugs 20 act as transverse traction bars in one direction of rotation, and the corresponding edges of the lugs 19 act as transverse traction bars in the opposite direction of rotation.

By using relatively wide grooves 18, and by preventing them from closing during use, snow and loose mud can be received in the grooves so that the bottoms of the grooves aid in supporting the weight of the vehicle.

In addition to the above, the lugs 19 and 20 positively prevent the grooves from closing under conditions which are encountered during braking and during acceleration. With present day low-pressure passenger car tires the grooves tend to close under braking action, and this is just when the grooves are needed to prevent skidding tendencies.

When operating in loose material, applicant's construction maintains grooves which are of sufficient capacity to accommodate and carry away material such as snow or mud which has been displaced by the ribs. Due to the transversely waved rider strip arrangement, the tendency which straight rider strips have to dig into snow or mud and make straight parallel elongated pockets and to spin in these pockets is eliminated. The lugs 19 and 20 also tend to overcome this tendency.

By having relatively wide grooves in conjunction with the transversely waved arrangement such as is shown in Fig. 6, the tendency for the surfaces of the rider strips to resiliently "pile up" in front of the places of contact of the rider strips with the road is corrected, because the transverse waves permit a periodic "discharge" of these "pile ups" into the intervening grooves. Thus, excessive wear is avoided.

Figure 7:
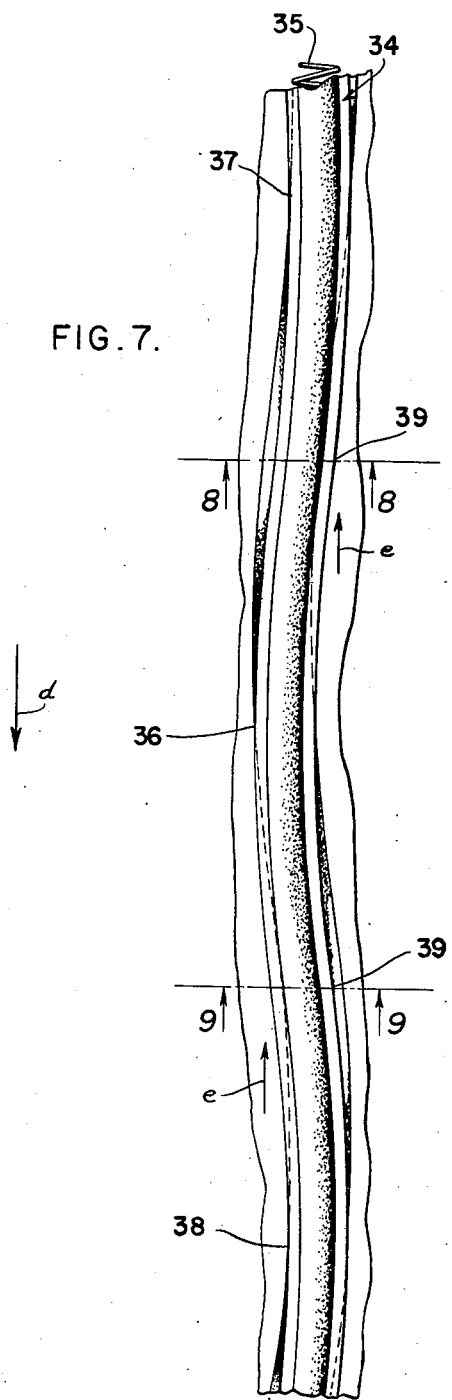
Fig. 7 is a fragmentary plan view of part of a tread surface such as that of Fig. 6, showing a rider strip which leans first in one direction and then in the other.
Figure 9:
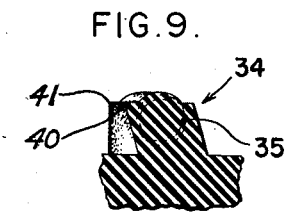
Fig. 9 is a sectional view taken on the line 9—9 of Fig. 7.

By having the rider strips lean in conformity with the curvature as illustrated in Figs. 7, 8 and 9, transversely waved rider strips may be used without having any tendency for leading edge portions of the curves of the rider strips to be worn excessively because of the transversely waved arrangement.

Various changes and modifications may be made without departing from the spirit of the invention, and all of such changes are contemplated, as may come within the scope of the claims.

What we claim is:

1. In a tire having a rubber tread portion provided with a plurality of spaced circumferentially extending serpentine rider strips which are formed by laterally waved portions, there being serpentine grooves between said rider strips, and metal traction augmenting members in said rider strips, there being one of said members for a rider strip with said member having a side portion substantially flush with the wearing surface of the rider strip and each of said traction augmenting members being waved in serpentine fashion to conform to its rider strip, the outermost rider strips being of varying width and having outer sides formed by the side walls of the tire, the tire having circumferentially spaced side wall recesses throughout the circumference which are of varying depth transversely of the tread and which extend through portions of the outermost rider strips to the surface of the thread, the recesses of greatest transverse depth extending into those portions of the outermost rider strips where the adjacent traction augmenting member is waved the greatest distance away from the side wall of the tire, and there being transverse recesses of progressively less transverse depth extending into other portions of the outermost rider strips as the adjacent traction augmenting members approaches closer to the side wall, and there being an absence of side wall recesses at those locations where the traction augmenting member is closest to the side wall, the last-mentioned distance approximating the distance between the bottom of any side wall recess and the adjacent portion of the adjacent traction augmenting member whereby more uniform heat transfer from the outermost coils to the atmosphere at the sides of the tire is provided regardless of variation in the distance of outermost coil portions from said side walls.

2. In a tire having a rubber tread portion provided with a plurality of spaced circumferentially extending serpentine rider strips which are formed by laterally waved portions, there being serpentine grooves between said rider strips, the outermost rider strips being of varying width and having outer sides formed by the side walls of the tire and having waved inner sides, the tire having circumferentially spaced side wall recesses throughout its circumference which are of varying depth transversely of the tread and which extend through portions of the outermost rider strips to the surface of the tread, the recesses of greatest transverse depth extending into those portions of the outermost rider strips which are waved the greatest distance away from the side walls of the tire, and there being transverse recesses of progressively less transverse depth extending into other portions of the outermost rider strips where the waved inner sides approach closer to the side walls, there being an absence of side wall recesses at those locations where the waved inner sides of the outermost rider strips are closest to the side walls, the distance between a side wall and the waved inner side of an outermost rider strip at said last-mentioned locations approximating the distance between the bottom of any side wall recess and the waved side of the adjacent rider strip whereby more uniform heat transfer to the atmosphere at the sides of the tire is provided regardless of variation in the width of said outermost rider strips.

(References on following page)

References Cited in the file of this patent

UNITED STATES PATENTS

| | | |
|---|---|---|
| 2,121,871 | Havens | June 28, 1938 |
| 2,239,070 | Work | Apr. 22, 1941 |
| 2,254,778 | Hoover | Sept. 2, 1941 |
| 2,260,193 | Overman | Oct. 21, 1941 |
| 2,265,543 | Overman | Dec. 9, 1941 |
| 2,322,505 | Bull | June 22, 1943 |
| 2,540,044 | Crooker | Jan. 30, 1951 |
| 2,557,945 | Crooker | June 26, 1951 |
| 2,610,357 | Hawkinson | Sept. 16, 1952 |
| 2,661,041 | Walsh | Dec. 1, 1953 |
| 2,701,598 | Gray | Feb. 8, 1955 |

FOREIGN PATENTS

| | | |
|---|---|---|
| 418,820 | Great Britain | Nov. 1, 1934 |